No. 887,308. PATENTED MAY 12, 1908.
J. H. B. BRYAN.
PIPE TAPPING DEVICE.
APPLICATION FILED MAR. 6, 1906.
2 SHEETS—SHEET 1.
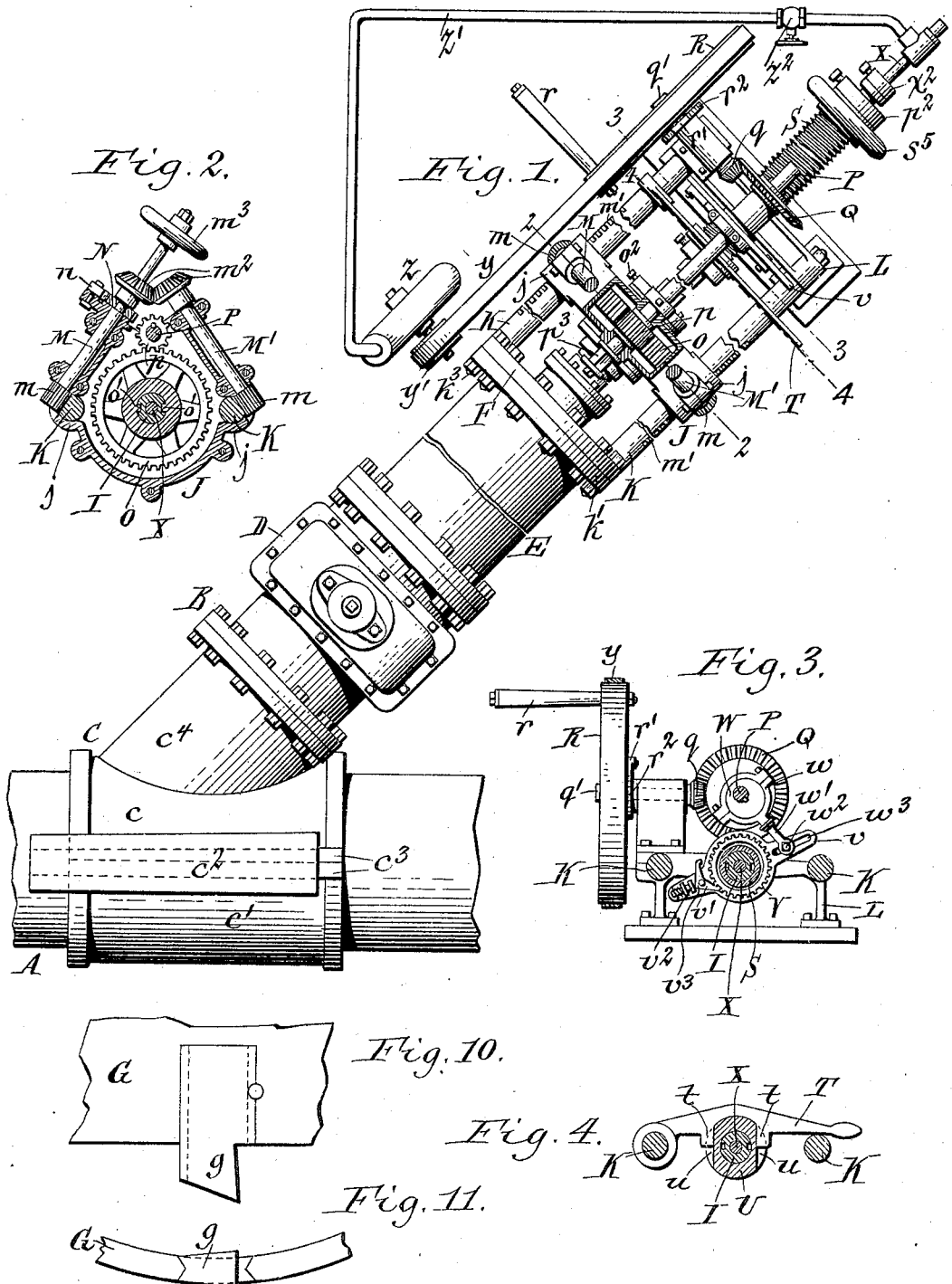

No. 887,308. PATENTED MAY 12, 1908.
J. H. B. BRYAN.
PIPE TAPPING DEVICE.
APPLICATION FILED MAR. 6, 1906.
2 SHEETS—SHEET 2.
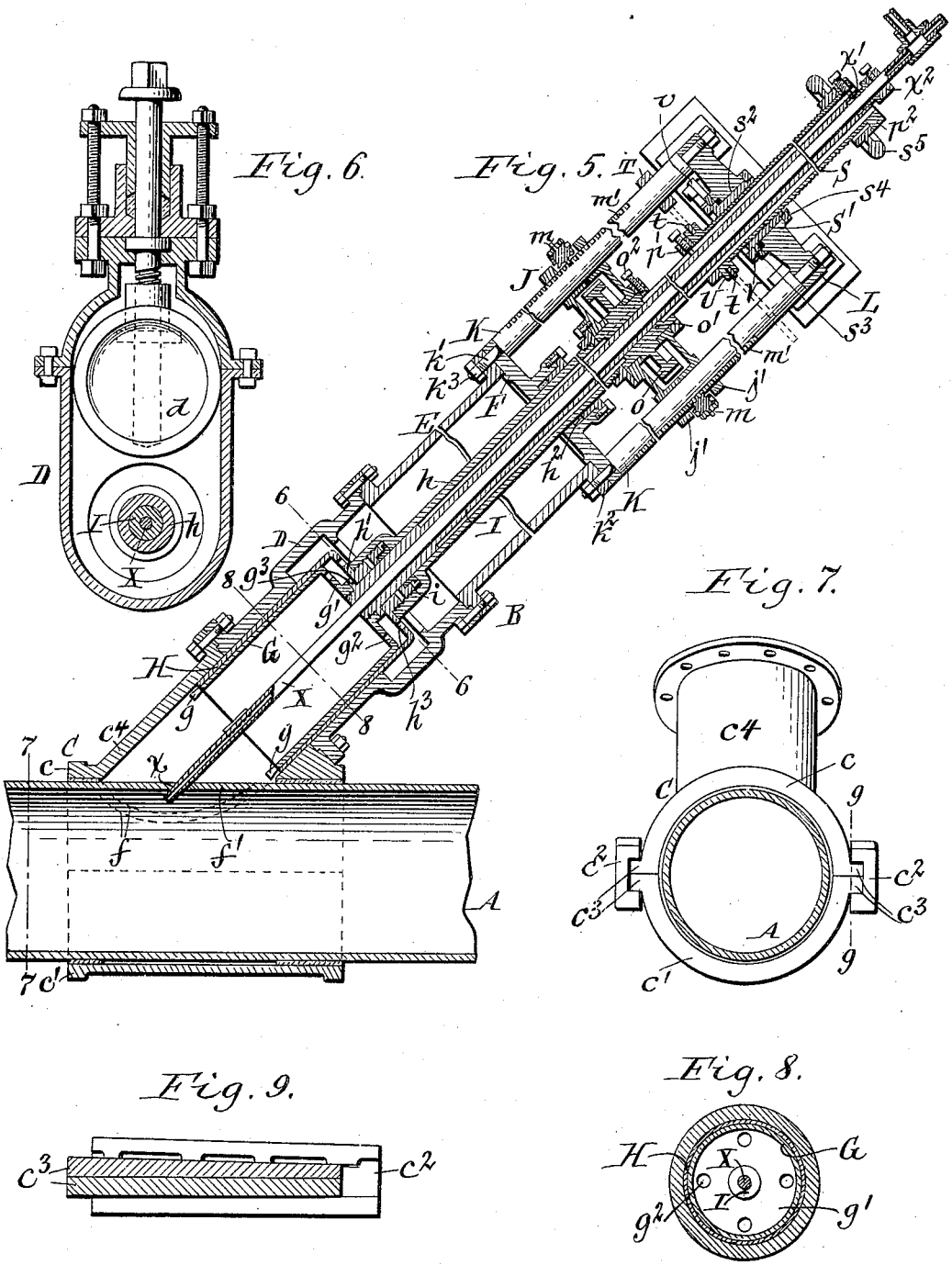

UNITED STATES PATENT OFFICE.

JOHN H. B. BRYAN, OF BUFFALO, NEW YORK, ASSIGNOR, BY DIRECT AND MESNE ASSIGNMENTS, OF ONE-THIRD TO NICHOLAS J. KELLY AND ONE-THIRD TO NORA KELLY, OF BUFFALO, NEW YORK.

PIPE-TAPPING DEVICE.

No. 887,308.  Specification of Letters Patent.  Patented May 12, 1908.

Application filed March 6, 1906. Serial No. 304,532.

*To all whom it may concern:*

Be it known that I, JOHN H. B. BRYAN, a citizen of the United States, residing at Buffalo, in the county of Erie and State of New York, have invented a new and useful Improvement in Pipe-Tapping Devices, of which the following is a specification.

This invention relates to a device for tapping a main pipe and connecting the same with a branch pipe and more particularly to a device of this character for making such connections with the main pipe or line of a water system without disturbing the use of the main pipe or interfering with the water system while such connection is being made. A device for this purpose is shown in the prior application for patent filed by myself on the 11th day of January, 1906, and numbered 295,527. The construction shown in this prior application is such that the same is incapable of tapping more than one size opening in the main pipe.

The object of the present invention is to provide a pipe tapping device which is so constructed that but few changes are necessary to permit of using the device for producing openings of different diameters.

In the accompanying drawings consisting of two sheets:—Figure 1 is a top plan view partly in section, of my improved pipe tapping device in position for producing an opening in a main pipe whereby the same is connected with a branch pipe. Figs. 2, 3 and 4 are vertical cross sections taken in lines 2—2, 3—3, and 4—4, Fig. 1 respectively. Fig. 5 is a longitudinal section of the tapping device applied to a main and branch pipe. Figs. 6, 7 and 8 are cross sections taken in the correspondingly numbered lines in Fig. 5. Fig. 9 is a longitudinal section taken in line 9—9, Fig. 7. Fig. 10 is a fragmentary view of the cutter carrier and one of the cutters or teeth thereon. Fig. 11 is an end view of the same.

Similar letters of reference indicate corresponding parts throughout the several views.

A represents the main pipe or line of a water distributing system which may form either the suction part or the delivery part of the main and B is the branch pipe connected therewith.

The connection between the main pipe and the branch pipe is primarily effected by means of a coupling or fitting C, the head of which is preferably divided diametrically lengthwise into two sections $c$, $c^1$ which are applied to opposite sides of the main pipe and held in place by means of wedging clips or bars $c^2$ which engage with opposing flanges $c^3$ formed lengthwise on the opposing longitudinal edges of the head sections. Any other suitable means may be employed for holding the head sections of the fitting on the main pipe.

The latter branch $c^4$ of the fitting may be arranged at any desired angle relatively to its head and the main pipe, but in the drawings the same is shown at an angle of forty five degrees relatively thereto.

D represents the body of a main gate valve having the front end of its passage or water way connected with the inner or front end of the fitting branch $c^4$.

E represents a short section of pipe which is connected at its front end with the rear end of the valve body D, this section together with the fitting branch $c^4$ and the valve body D being axially in line. The fitting branch and valve body form the initial portion of the branch pipe B which is to be permanently connected with the main pipe and the pipe section E may also, if desired, form a permanent part of the branch pipe but it is preferable to remove the same together with parts of the tapping device with which it is connected.

F represents a head cover or closure secured to the outer end of the pipe section E for closing the same and preventing the escape of water while cutting the opening in the main pipe within the fitting branch. This opening is formed by producing a circular kerf $f$ in the main pipe of substantially the same diameter as the bore of the fitting branch, thereby severing or cutting out a circular section or "patch" $f^1$ which is subsequently removed. The means shown in the drawings for producing this kerf consists of an annular series of cutters or milling teeth $g$ which rotate close to the bore of the fitting branch about an axis which coincides with that of the fitting branch, valve body and pipe section F. These cutters are supported by a rotary and longitudinal movable carrier consisting of a cylindrical body G which is opened at its front end and provided at its rear end with a head $g^1$. The cutter teeth $g$ project lengthwise forward from the front end of the carrier body and are secured thereto in any suitable manner but if desired these teeth may be formed integral with said body.

In order to permit the cutter teeth to clear themselves and prevent binding or cramping as they enter the metal of the main pipe each of these teeth tapers from its wide front end toward its narrow rear end and projects radially outwardly beyond the periphery of the carrier body and inwardly beyond the bore thereof, as shown in Figs. 5 and 11, so that the carrier body is free to follow into the kerf behind the cutter teeth.

In order to hold the cutter body accurately in a central position within the fitting branch during the cutting operation, a guide sleeve H is provided which is interposed between the outer side or periphery of the carrier body and the adjacent part of the fitting branch and gate valve passage. This guide sleeve is of such thickness that it holds the outer portions of the cutter teeth out of contact with the bore of the fitting branch and serves to hold the cutter carrier accurately in a central position while the latter is being rotated for producing the kerf and also while the same is being fed forward as the cutting operation progresses.

$h$ represents a tubular shank passing axially through an opening in the head F and connected at its front end with a head $h^1$ at the rear end of the guide sleeve. Within this shank is arranged a longitudinal cutter shaft I which is connected at its inner or front end with the head of the cutter body by a screw joint, as shown in Fig. 5, or by any other suitable means. Leakage between the head F and the tubular shank is prevented by means of a stuffing box $h^2$ arranged on said head. For the same purpose a stuffing box $i$ is arranged in the enlarged front part of the shank around the cutter shaft.

Various means may be employed for moving the cutter carrier and its guide sleeve axially in the fitting branch, valve passage and pipe section E and also rotating the cutter carrier during the operation of tapping the main pipe.

J represents a carriage which is movable lengthwise of the axis of the cutter carrier and the branch pipe adjacent to the outer end of the pipe section E. This carriage is guided by means of two parallel rods or bars K, K arranged lengthwise on opposite sides of said axis and receiving eyes or sleeves $j$ on opposite sides of the carriage by which the latter is slidably mounted on said bars. The front ends of these bars are preferably supported by means of reduced screw shanks $k^1$ formed thereon and passing through openings in the marginal portion of the head F and a flange $k^2$ formed on the outer end of the pipe section E and screw nuts $k^3$ applied to said shanks in front of the said flange.

The rear ends of these bars are in like manner secured to the standard or pedestal L. The outer end of the tubular shank $h$ is rigidly connected with the front side of the carriage so that the guide sleeve H is compelled to move lengthwise with the carriage. The longitudinal movement of the carriage and the parts connected therewith may be effected in any suitable way but preferably by means of two upwardly converging shafts M, $M^1$ journaled in bearings on the carriage and provided at their lower ends with gear pinions $m$ which mesh with gear racks $m^1$ formed on the guide bars, intermeshing bevel gear wheels $m^2$ arranged on the upper ends of said shafts and a hand wheel $m^3$ applied to one of them. Upon turning this hand wheel in one direction or the other both converging shafts are turned in unison and by their pinions engaging with the gear racks, causing the carriage and connecting parts to move forward or backward without cramping or binding any of them. In order to hold these parts against backing up after they have been moved into their forward or operative position, a detent or holding device is provided which preferably consists of a ratchet wheel N secured to the shaft M and a pawl $n$ mounted on the carriage and engaging with the teeth of the ratchet wheel N. This pawl is moved into an inoperative position when it is desired to move the carriage and connecting parts backwardly.

O represents a gear wheel journaled on the carriage but compelled to move lengthwise therewith. This is preferably effected by constructing the carriage in two sections $j^1$, $j^1$ between which the wheel is arranged and which have bearings receiving the ends of the hub of the gear wheel O. The cutter shaft I passes axially through the hub of the gear wheel O and is operatively connected therewith by splines $o^1$ whereby the cutter shaft is compelled to turn with the gear wheel but normally is free to move lengthwise independent thereof.

P represents a horizontal counter shaft arranged lengthwise above the cutter shaft and journaled at its front and rear ends in bearings formed in the upper parts of the carriage J and the pedestal but held against axial movement in the carriage. Between the upper parts of the carriage sections the countershaft has secured thereto a pinion $p$ which meshes with the upper part of the gear wheel O. At its rear end the counter shaft is provided with a beveled gear wheel Q which meshes with a beveled gear pinion $q$. The latter is secured to the inner end of a transverse driving shaft $q^1$ which is journaled transversely in a bearing on the pedestal and which may be rotated by means of a driving wheel R secured to the outer end of the driving shaft $q^1$ and provided with a crank or handle $r$. The rotary movement of the driving shaft $q^1$ is transmitted successively by the pinion $q$, gear wheel Q, counter shaft P and gear wheels $p$, O to the cutter shaft when the tapping device is in use.

S represents a feed screw and $S^1$ a screw nut which form part of the mechanism whereby the cutter and its shaft are moved axially. The feed screw is of hollow or tubular form and receives the outer end of the cutter shaft. The screw nut $S^1$ engages with the thread of the feed screw and is journaled in a bearing $s^2$ in the central portion of the pedestal but is held against axial movement therein by means of a head $s^3$ arranged on the front end of the screw nut and bearing against the front side of the bearing $s^2$ and a retaining nut $s^4$ arranged at opposite ends of the screw nut and engaging with the opposite end of said bearing.

During the first part of the cutting operation it is desirable to effect the forward feed of the cutter carrier by hand in order to get the cutter started properly but after the beginning of the cutting operation the feeding of the cutter carrier is effected automatically.

To permit of feeding the cutter carrier by hand the screw nut $S^1$ is held stationary in the pedestal, the feed screw S is held against axial movement relatively to the cutter shaft by securing collars $p^1$, $p^2$ to the cutter shaft at the front and rear ends of the feed screw, and a hand wheel $s^5$ is secured to the rear end of the feed screw for manipulating the same manually. Upon turning the hand wheel forwardly in this condition of the parts the feed screw working against the nut $S^1$ on the pedestal causes the cutter shaft to be advanced together with the cutter carrier at the same time that these parts are being turned.

The mechanism whereby the cutter carrier and connecting parts may be automatically moved lengthwise is constructed as follows: T represents a transverse locking or a holding bar or arm which is pivoted at one end on one of the guide bars K and adapted to rest with its opposite end on the other guide bar while its central part is provided with two jaws $t, t$ which engage with the recesses $u$ in opposite sides of a locking head U arranged at the front end of the feed screw, the bottoms of said recesses being flat, as shown in Fig. 4. By this construction, the recesses $u$ when engaged by the jaws of the holding bar prevent the feed screw from turning and the holding arm is compelled to move lengthwise with the feed screw during which movement the holding bar slides lengthwise on the guide arm K to which it is pivoted. V represents a ratchet wheel or rim formed on or secured to the front end of the screw nut $S^1$ and $v$ represents an oscillating ratchet or feed lever journaled upon the feed nut $S^1$ between the ratchet wheel and the front side of the pedestal. One arm of this feed lever has pivoted thereto a double ended pawl $V^1$ either one of which may be held yieldingly in engagement with the teeth of the ratchet wheel V by means of a spring pressed plunger $v^2$ arranged on one arm of the feed lever and engaging with one side or the other of the heel $v^3$ formed on said pawl adjacent to the pivot thereof. W represents an eccentric secured to the countershaft and having its surrounding strap $w$ adjustably connected with the other arm of the feed lever by means of a connecting rod $w^1$ and a bolt $w^2$ passing through said rod and a radial slot $w^3$ in said arm, as shown in Fig. 3. During the rotation of the countershaft its eccentric oscillates the feed lever $v$ and the latter by engaging one end or the other of its pawl with the ratchet wheel turns the feed nut intermittently causing the feed screw to be moved lengthwise together with the parts connected therewith.

In producing the kerf in the main pipe which separates the section or "patch" $f^1$ of the main pipe to be removed it is necessary to retain control of said "patch" in order to prevent the same from being carried away by the water and interfere with the distributing system. For this purpose an opening $x$ is previously bored into the central part of the "patch" which is to be removed by the device shown in the co-pending application for Letters Patent No. 296,634 filed by myself, on the 18th day of January, 1906. Into this opening is firmly secured the front end of a retaining rod X preferably by tapering this end of the rod and driving the same firmly into said opening. This rod is arranged axially within the cutter shaft which latter is made hollow or tubular for this purpose and the same projects with its rear end beyond the rear end of the cutter shaft to permit of manipulating the same. For preventing leakage between the retaining rod and the cutter shaft a stuffing box $x^1$ is arranged at this end of the shaft. The retaining rod is prevented from being drawn inwardly together with the "patch" secured thereto by means of a collar $x^2$ secured to the outer part thereof and engaging with the gland of the stuffing box $x^1$ or the adjacent part of the cutter shaft.

Instead of turning the driving shaft $q^1$ by hand this may be effected by power derived from the pressure of the water in the main. For this purpose the wheel R may be driven by a belt $y$ from the pulley $y^1$ of a water motor $z$, the retaining rod X being made hollow or tubular so as to permit water to be drawn off through the same, and the outer end of this rod being connected with the motor by means of a pipe $z^1$ containing a valve $z^2$ for controlling the water supply.

Assuming that the central opening $x$ has been previously bored or drilled into the "patch" by means of the boring device of the co-pending application No. 296,634 above referred to and that the gate $d$ of the valve body D is closed, the operation of cutting out the "patch" from the main pipe for producing a full opening between the main pipe and the branch pipe by the use of the present tapping device is as follows:—The several parts of the tapping device are so assembled that the feed screw is at its outermost position in the feed nut, the carriage is in its outermost position on the guide bars, the pipe section E and head $h$ are connected with the front ends of the guide bars K, the guide sleeve H and the cutter carrier are in their rearmost position within the pipe section E, the holding arm is disengaged from the locking head U and the retaining rod X is inserted in the hollow cutter shaft. The front end of the pipe section E is now secured to the outer or rear end of the valve body D by bolts or otherwise so that this pipe section forms a closed extension of the passage way of the main valve. The gate $d$ of the latter is now opened permitting the water to pass from the main pipe successively through the opening $x$ the fitting branch and the main valve body into the pipe section E. By opening the gate $d$ an unobstructed path is also formed which permits of moving the parts of the tapping device within the section E forwardly into engagement with the main pipe without however permitting the escape of any water. The retaining rod X may be moved forward simultaneously with the cutter carrier while in such position that its front end is inserted in the opening $x$ of the "patch" before the cutter mechanism engages the main pipe but if desired the retaining rod may be first pushed forward until its front end is firmly wedged in the opening $x$ and then the cutter carrier and its guide sleeve may be moved forward close to the main pipe ready to begin the cutting operation. This forward movement of the retaining rod can be easily effected by hand as the area which the same exposes to the water pressure is not sufficient to offer any considerable resistance. The cutter carrier and its guide sleeve however present a considerable area to the water pressure and the heads of these parts are therefore provided with openings $g^2$, $h^3$ which permit the water to pass through the same so that the water pressure against opposite sides of these parts is neutralized, thereby permitting the same to be moved forward easily into their operative positions. This forward movement of the parts is produced by turning the hand wheel $m^3$ in the proper direction for causing the pinions $m$ by engaging with the gear racks to move the carriage J forwardly, this movement being transmitted by the tubular shank to the cutter guide and also to the cutter carrier by engagement of the head of the guide sleeve against a shoulder $g^3$ at the front end of the cutter shaft. When the cutter carrier and guide sleeve have reached the beginning of their operative position, as shown in Fig. 5, the cutter shaft is rotated either by hand power applied to the crank $r$ or by water power derived from the motor or if desired by applying a ratchet lever applied to the flat sided front end $p^3$ of the countershaft. For starting the cutting operation the cutter carrier is fed forward slowly by turning the feed screw in the proper direction by means of the hand wheel $s^5$, the feed nut being held stationary at this time, and the pawl $v^1$ being thrown out of engagement with the ratchet wheel V. After the cutting operation has been started the holding arm T is engaged with a locking head U of the feed screw for holding the latter against turning and the pawl $v^1$ is turned with the proper end in engagement with the ratchet wheel V for causing the feed nut to be turned in the direction for moving the feed screw, the cutter shaft and the cutter carrier forwardly. The speed of this forward feed must be varied according to the character of the main pipe which is being cut and may be regulated by moving the rod $w^1$ inwardly or outwardly in the slot $w^3$ of the feed lever $v$ for obtaining the required feeding action of the cutter. While thus feeding the cutter carrier forwardly the cutter guide remains behind with its front edge adjacent to the periphery of the main pipe so as to support the cutter carrier as close as possible to the cutting line. Inasmuch as the backward rotation of the cutter carrier is liable to injure or break off the cutter teeth which present an abrupt front side and an inclined rear side, as shown in Fig. 10, means are provided for preventing such an occurrence the same preferably consisting in mounting the driving gear wheel R loosely on the main shaft $q^1$ and operatively connecting the same therewith by a pawl $r^1$ arranged on the driving wheel and engaging with a ratchet wheel $r^2$ on the driving shaft, as shown in Figs. 1, 3 and 11 whereby the cutter is compelled to turn forwardly with the driving wheel but the latter when moved backwardly does not affect the cutter.

After the "patch" has been cut out the same is first drawn outwardly within the cutter carrier by means of the retaining rod X and then the cutter carrier and guide sleeve are retracted into their outer positions within the pipe section E. The gate $d$ of the main valve may now be closed permitting the front end of the pipe section E to be removed from the gate valve together with the parts mounted thereon after which the extension of the branch pipe E from the outer side of the gate valve may be effected in the usual manner.

The parts of the tapping device may be manipulated in various ways for effecting the retraction of the cutter carrier and the guide sleeve into the pipe section E preparatory to closing the gate *d* of the main valve. One way of doing this is to manipulate the parts whereby the guide sleeve and cutter carrier are moved in the opposite direction from that just described but this method is comparatively slow. For effecting a quick retraction of these parts it is preferable to first back the feed screw S outwardly by means of the hand wheel $s^5$ until the cutter carrier has been withdrawn into its guide sleeve after which the cutter shaft is coupled with the carriage so as to be compelled to move outwardly with the same and the guide sleeve by means of a clamping screw $o^2$ passing through one end of the hub of the gear wheel O and set tight against the cutter shaft at the time for effecting such withdrawal. This screw is disengaged from the cutter shaft when the cutter is in operation.

If it is desired to make the machine comparatively short the length of the feed screw S may be reduced in length and in that case this screw after its feeding action in one direction has been exhausted may be shifted into the opposite position independent of the cutter shaft by first loosening the collars $p^1$, $p^2$, then reversing the rotation of the feed screw S to the end of its movement in the opposite direction and then refastening the collars $p^1$, $p^2$ to the cutter shaft at opposite ends of the feed screw in its shifted position when the shifting effect of this screw may be repeated.

When this tool or device is to be used for tapping openings of different diameters in a main pipe it is only necessary to substitute a cutter carrier, guide sleeve and pipe extension E of larger or smaller diameter for the one previously used, the other parts remaining in the same position and operating as before described.

I claim as my invention:—

1. A tapping device for connecting a main pipe with a branch pipe, comprising a cylindrical carrier of smaller diameter than the bore of said branch pipe and adapted to be rotated and also moved axially therein, cutters arranged at the front end of said carrier and projecting laterally beyond the periphery of the carrier and adapted to produce an opening in said main pipe of a diameter approximately the same as the bore of the branch pipe, a guide sleeve fitting with its bore around the periphery of the carrier while its periphery is arranged beyond said cutters and is adapted to bear against the bore of the branch pipe, and means for moving said carrier and sleeve axially together or one independent of the other, substantially as set forth.

2. A tapping device for connecting a main pipe with a branch pipe comprising a rotatable cutter carrier adapted to be placed in said branch pipe, a shaft connected with said carrier, a gear wheel splined to said shaft, a longitudinally movable carriage on which said gear wheel is journaled, a driving mechanism operatively connected with said gear wheel, and means for connecting and disconnecting said carriage and shaft so as to permit of moving the same lengthwise together or permit the carriage to move independently of the shaft, substantially as set forth.

3. A tapping device for connecting a main pipe with a branch pipe comprising a rotatable cutter carrier adapted to be placed in said branch pipe, a shaft connected with said carrier, a gear wheel splined to said shaft, a longitudinally movable carriage on which said gear wheel is journaled and which is composed of two sections pivotally supporting said gear wheel at opposite ends of its hub, a driving mechanism operatively connected with said gear wheel, and means for connecting and disconnecting said carriage and shaft so as to permit of moving the same lengthwise together or permit the carriage to move independently of the shaft, substantially as set forth.

4. A tapping device for connecting a main pipe with a branch pipe comprising a rotary cutter carrier adapted to be placed in said branch pipe, a shaft connected with said cutter carrier, a driving mechanism for said shaft comprising a gear wheel splined on said shaft, a longitudinally movable carriage on which said gear wheel is journaled, a driving pinion mounted on the carriage and meshing with the gear wheel, guide bars in which said carriage is slidably supported, and means for connecting and disconnecting said carriage and shaft and causing the same to move axially together or permitting one to move axially independently of the other, substantially as set forth.

5. A tapping device for connecting a main pipe with a branch pipe comprising a rotary cutter carrier adapted to be placed in said branch pipe, a shaft connected with said cutter carrier, a driving mechanism for said shaft comprising a gear wheel splined on said shaft, a longitudinally movable carriage on which said gear wheel is journaled, a driving pinion mounted on the carriage and meshing with the gear wheel, guide bars on which said carriage is slidably supported, means for moving said carriage lengthwise of said bars comprising gear racks arranged on said bars, and pinions mounted on said carriage and meshing with said gear racks, and means for connecting and disconnecting said carriage and shaft and causing the same to move axially together or permitting one to move axially independently of the other substantially as set forth.

6. A tapping device for connecting a main pipe with a branch pipe comprising a rotary cutter carrier adapted to be placed in said branch pipe, a shaft connected with said cutter carrier, a driving mechanism for said shaft comprising a gear wheel splined on said shaft, a longitudinally movable carriage on which said gear wheel is mounted, a driving pinion mounted on the carriage and meshing with the gear wheel, guide bars arranged lengthwise on opposite sides of said shaft and supporting the ends of said carriage, means for moving said carriage lengthwise on said bars consisting of gear racks arranged on said bars, upwardly converging shafts journaled on said carriage, pinions arranged on the lower ends of said converging shafts and meshing with said gear racks, intermeshing gear wheels arranged on the upper ends of the converging shafts, and a handle or wheel arranged on one of the converging shafts, and means for connecting and disconnecting said carriage and shaft and causing the same to move axially together or permitting one to move axially independently of the other substantially as set forth.

7. A tapping device for connecting a main pipe with a branch pipe comprising a rotary cutter carrier adapted to be placed in said branch pipe, a shaft connected with said cutter carrier, a driving mechanism for said shaft comprising a gear wheel splined on said shaft a longitudinally movable carriage on which said gear wheel is journaled, a driving pinion mounted on the carriage and meshing with the gear wheel, means for connecting and disconnecting said carriage and shaft for causing said shaft and carriage to move together axially or permit these parts to move axially independently of each other, substantially as set forth.

8. A tapping device for connecting a main pipe with a branch pipe comprising a rotary cutter carrier adapted to be placed in said branch pipe, a shaft connected with said cutter carrier, a driving mechanism for said shaft comprising a gear wheel splined on said shaft, a longitudinally movable carriage on which said gear wheel is journaled, a driving pinion mounted on the carriage and meshing with the gear wheel, means for connecting or disconnecting said carriage and shaft, consisting of a clamping screw arranged on the hub of said gear wheel and adapted to be engaged with said shaft for causing said cutter carrier to move lengthwise with said carriage, or permitting these parts to move independently of each other, substantially as set forth.

9. A tapping device for connecting a main pipe with a branch pipe, comprising a cutter carrier adapted to be placed in said branch pipe, a shaft connected with said carrier, an operating mechanism connected with said shaft, a guide sleeve adapted to be interposed between said cutter carrier and the bore of the branch pipe, a tubular shank surrounding said shaft and connected with said guide sleeve, and a shifting device connected with said shank, substantially as set forth.

10. A tapping device for connecting a main pipe with a branch pipe comprising a cutter carrier adapted to be placed in said branch pipe, a shaft connected with said carrier, a guide sleeve adapted to be interposed between said carrier and branch pipe, a tubular shank surrounding said shaft and connected with said sleeve, and a carriage adapted to be connected or disconnected with said shank, substantially as set forth.

11. A tapping device for connecting a main pipe with a branch pipe comprising a rotary cutter carrier adapted to be inserted in said branch pipe, a cutter shaft connected with said carrier, and means for moving said shaft axially comprising a rotatable feed screw operatively connected with the cutter shaft, a rotatable screw nut engaging with said feed screw, means for holding said screw against turning or releasing the same to permit turning thereof, and means for turning said feed screw and holding said nut against turning substantially as set forth.

12. A tapping device for connecting a main pipe with a branch pipe comprising a rotary cutter carrier adapted to be inserted in said branch pipe, a cutter shaft connected with said carrier and means for moving said shaft axially comprising a tubular feed screw rotatable on the cutter shaft, means for holding said feed screw against turning or releasing the same to permit turning thereof, a rotatable screw nut adapted to be held stationary and engaging with said feed screw, and a hand wheel secured to said feed screw for turning the latter, substantially as set forth.

13. A tapping device for connecting a main pipe with a branch pipe comprising a rotary cutter carrier adapted to be inserted in said branch pipe, a cutter shaft connected with said carrier and means for moving said shaft axially comprising a feed screw mounted on said cutter shaft, means for compelling said screw and shaft to move in unison axially, a rotary screw nut journaled in a stationary bearing and engaging with said feed screw, means for holding said screw nut against rotation or permitting rotation thereof, and means for holding said feed screw against rotation or permitting rotation thereof, and means for rotating either the feed screw or the screw nut, substantially as set forth.

14. A tapping device for connecting a main pipe with a branch pipe comprising a rotary cutter carrier adapted to be inserted in said branch pipe, a cutter shaft connected with said carrier, and means for moving said shaft axially comprising a feed screw mounted on said cutter shaft, means for compelling said screw and shaft to move in unison axially, a rotatable screw nut mounted in a stationary bearing and engaging with said feed screw, means for rotating said feed screw independently of said shaft, and means for holding said feed screw against rotation, consisting of a head arranged on said feed screw and provided on opposite sides with recesses having flat bottoms, and a holding arm having a pair of jaws entering said recesses and engaging the bottoms thereof, substantially as set forth.

15. A tapping device for connecting a main pipe with a branch pipe comprising a rotary cutter carrier adapted to be inserted in said branch pipe, a cutter shaft connected with said carrier, and means for moving said shaft axially comprising a feed screw mounted on said cutter shaft, means for compelling said screw and shaft to move in unison axially, a rotary screw nut journaled in a stationary bearing and engaging with said feed screw, means for rotating said feed screw independently of said shaft, and means for holding said feed screw against rotation, consisting of a head arranged on said feed screw and provided on opposits sides with recesses having flat bottoms, stationary guide bars arranged lengthwise on opposite sides of the cutter shaft and feed screw, a transverse holding arm pivoted at one end on one guide bar and resting at its opposite end on the other guide bar, and a pair of jaws arranged on the central part of said arm and engaging with said recesses, substantially as set forth.

16. A tapping device for connecting a main pipe with a branch pipe comprising a rotary cutter carrier adapted to be inserted in the branch pipe, a hollow cutter shaft connected with the cutter carrier, a tubular retaining rod arranged in said shaft and adapted to be inserted in an opening in the main pipe, and means for rotating said cutter shaft and carrier comprising a water motor which is supplied by said tubular retaining rod, substantially as set forth.

Witness my hand this 29th day of January, 1906.

JOHN H. B. BRYAN.

Witnesses:
 THEO. L. POPP,
 RUTH TARBELL.